(12) United States Patent
Gu et al.

(10) Patent No.: US 6,220,089 B1
(45) Date of Patent: Apr. 24, 2001

(54) VIBRATION DUMMY APPARATUS

(75) Inventors: Yi Gu, Westland; Christopher A. Williams, Redford; Terry R. O'Bannon, Royal Oak, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/260,575

(22) Filed: Mar. 1, 1999

(51) Int. Cl.$^7$ .............................. G01M 19/00; A61B 5/00
(52) U.S. Cl. ...................................... 073/172; 073/866.4
(58) Field of Search .................................... 73/172, 866.4

(56) References Cited

U.S. PATENT DOCUMENTS

| | | |
|---|---|---|
| 3,501,777 | 3/1970 | Degtyarev et al. ............... 3/15 |
| 3,592,041 | 7/1971 | Spencer ........................... 73/7 |
| 3,753,302 * | 8/1973 | Daniel ............................. 35/17 |
| 4,773,865 | 9/1988 | Baldwin . |
| 5,018,977 * | 5/1991 | Wiley et al. ..................... 434/274 |
| 5,116,381 | 5/1992 | Palfray ............................ 623/33 |
| 5,336,270 | 8/1994 | Lloyd .............................. 623/33 |
| 5,376,127 | 12/1994 | Swanson ......................... 623/27 |
| 5,379,646 | 1/1995 | Andrzejak et al. .............. 73/804 |
| 5,465,605 | 11/1995 | Smith .............................. 73/7 |
| 5,526,707 | 6/1996 | Smrcka ........................... 73/866.4 |
| 5,628,230 | 5/1997 | Flam . |
| 5,703,303 | 12/1997 | Stewart . |
| 5,821,415 | 10/1998 | Faust et al. . |
| 6,009,750 * | 1/2000 | Maurer et al. .................. 73/172 |
| 6,116,102 * | 9/2000 | Faust et al. ..................... 73/866.4 |

FOREIGN PATENT DOCUMENTS

| | | |
|---|---|---|
| 3432633 C1 | 5/1986 | (DE) . |
| 2 641 398 * | 7/1990 | (FR) . |

OTHER PUBLICATIONS

Yi Gu, "A Comparison Test of Transmissibility Response From Human Occupant and Anthropodynamic Dummy", SAE International, Feb. 23–26, 1998, No. 980655.

* cited by examiner

Primary Examiner—Hezron Williams
Assistant Examiner—Rose M. Miller
(74) Attorney, Agent, or Firm—Brooks & Kushman P.C.

(57) ABSTRACT

Vibration dummy apparatus adapted to sit on and be supported by a vehicle seat to accurately simulate human vibration response at an interface between the apparatus and seat cushions of the vehicle seat is disclosed. The apparatus includes a relatively hard and stiff skeletal frame structure having a pelvic girdle, a pair of femurs, and a pair of ball-and-socket joints for connecting their respective femurs to the pelvic girdle. Elastomeric plastic is formed over the skeletal frame structure. The elastomeric plastic has a substantially anatomically-correct, surface geometry. The elastomeric plastic formed over the pelvic girdle and the pair of femurs has mechanical properties including human-like, soft tissue spring and damping characteristics. A mass-spring system is connected to the pelvic girdle to at least partially simulate vibration response of an upper section of a human.

8 Claims, 2 Drawing Sheets

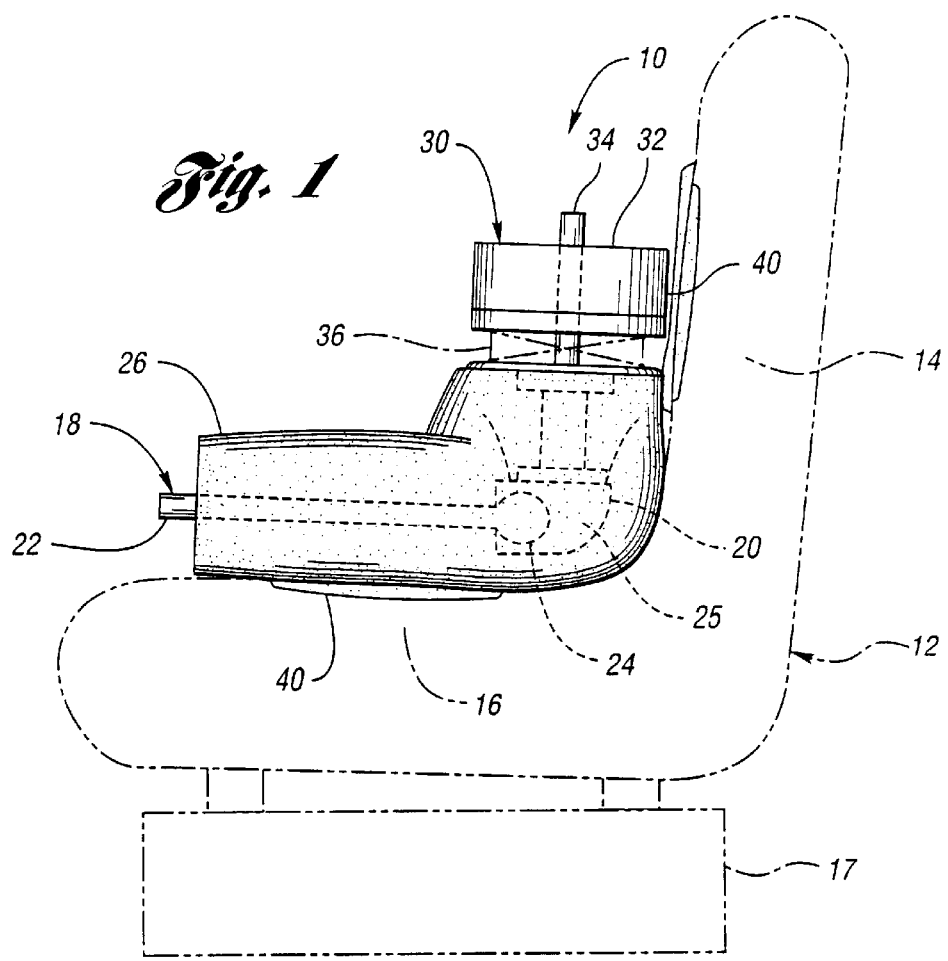
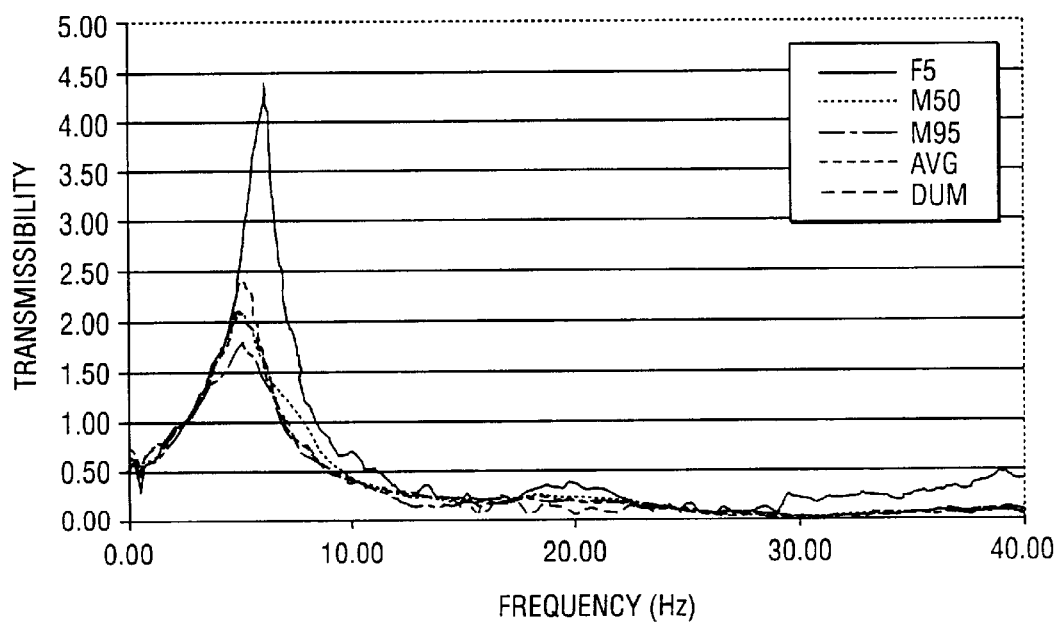

VIBRATION DUMMY APPARATUS

CROSS-REFERENCE TO RELATED APPLICATIONS

This application is related to the following U.S. patent applications filed on the same date as this application and entitled: "A Biofidelic Human Seating Surrogate Apparatus" U.S. Ser. No. 09/260,620 and "Method And System For Wear Testing A Seat By Simulating Human Seating Activity And Robotic Human Body Simulator For Use Therein." Now U.S. Pat. No. 6,131,436 issued Oct. 17, 2000.

This application is related to the following U.S. patent applications filed on the same date as this application and entitled: "A Biofidelic Human Seating Surrogate Apparatus" and "Method And System For Wear Testing A Seat By Simulating Human Seating Activity And Robotic Human Body Simulator For Use Therein."

TECHNICAL FIELD

This invention relates to vibration dummy apparatus and, in particular, to vibration dummy apparatus which are capable of simulating human vibration response.

BACKGROUND ART

Human vibration comfort has attracted more attention in recent development effort by OEM's and suppliers. This is due to the new phase of NVH improvement and competition in vehicle design. Improving human ride comfort has always been an issue for vehicle component designers and manufacturers. For seating and interior integrators, a great deal of effort has been focused on improving the ride comfort.

Vibration transmissibility has been used as an indicator to measure the comfort of ride by researchers for many years. The ratio of acceleration of the seat cushion or seat back to that of the floorpan is used to measure the transmission of vibration from vehicle to the human occupant. A difficulty arises when a large number of human occupants are needed for a valid test or a component quality evaluation. Component suppliers usually cannot afford such expensive tests during prototype development stage. The number of tests involved to improve the quality of seating systems requires a quicker and more repeatable way to measure the seat vibration performance.

A rigid mass dummy has been used to set a "benchmark" for the seat vibration performance measurement. The rigid mass dummy, however, cannot provide a similar transmissibility measurement to that of a human so its application is largely limited.

In Gu, Y., "A Comparison Test Of Transmissibility Response From Human Occupant And Anthropodynamic Dummy", SAE paper 980655 dated Feb. 23–26, 1998, a spring-mass dummy is described which was designed to match the human response in low frequency in a vertical direction. A six-axis hydraulic shaker table was employed as the excitation source to the occupied seat. Two seat samples, both measured with human occupants before, were used. For simplicity and comparison, a sweep sine signal in the vertical direction was used as the excitation signal. The transmissibility results measured for the dummy-loaded seat were compared to those of human occupants. The vibration response from a dummy-occupied seat was correlated to that from a human-occupied seat. A consistent relation was shown between the two measurements. However, there are problems of accuracy and stability of transmissibility measurement when utilizing such a spring-mass dummy.

U.S. Pat. No. 3,501,777 discloses a urethane foam disposed over a simulated skeleton.

U.S. Pat. No. 5,376,127 discloses polyethylene sheet material surrounding a endoskeleton.

U.S. Pat. No. 5,166,381 discloses a lower leg cast of thermoplastic material.

U.S. Pat. No. 5,526,707 discloses a simulated pregnant crash test dummy.

U.S. Pat. No. 5,336,270 discloses a plastic material formed over inner components.

U.S. Pat. No. 5,703,303 discloses a simulated torso for testing seats, with the torso being mounted on a boom.

U.S. Pat. No. 5,465,605 discloses a carpet wear testing machine that rolls a simulated heel over the carpet.

U.S. Pat. No. 3,592,041 discloses chair/seat testing by hydraulically controlled back and seat simulators.

U.S. Pat. No. 5,379,646 discloses a test dummy with "back-specific" pressure units for testing vehicle seat backs.

DISCLOSURE OF INVENTION

An object of the present invention is to provide a vibration dummy apparatus which closely matches human vibration response when random excitation signals are applied to a vehicle/seat occupied by the apparatus, thereby providing an improved tool in seat prototype development.

In carrying out the above object and other objects of the present invention, a vibration dummy apparatus is provided. The vibration dummy apparatus is adapted to sit on and be supported by a vehicle seat to accurately simulate human vibration response at an interface between the apparatus and seat cushions of the vehicle seat. The apparatus includes a relatively hard and stiff skeletal frame structure. The skeletal frame structure, in turn, includes a pelvic girdle, a pair of femurs, and a pair of ball-and-socket joints for connecting their respective femurs to the pelvic girdle. The apparatus also includes elastomeric plastic formed over the skeletal frame structure. The elastomeric plastic has a substantially anatomically-correct, surface geometry. The elastomeric plastic formed over the pelvic girdle and the pair of femurs has mechanical properties including human-like, soft tissue spring and damping characteristics. The apparatus further includes a mass-spring system connected to the pelvic girdle for at least partially simulating vibration response of an upper section of a human.

Preferably, the pelvic girdle and femurs are substantially geometrically correct.

The mass-spring system includes a mass weight which is adjustable and a spring having an adjustable spring rate.

The pelvic girdle includes a pair of coxae wherein the first pair of ball-and-socket joints connect their respective femurs to their respective coxae.

The plastic formed over the pelvic girdle and the pair of femurs has an effective stiffness in a range of 6 to 140 kPa.

The elastomeric plastic may be a castable urethane elastomer molded over the skeletal frame structure.

Preferably, the mechanical properties are substantially the same as mechanical properties of bulk muscular tissue in a state of moderate contraction.

The new vibration dummy apparatus utilizes a compressive lower torso and combines it with a metal spring-mass upper torso to reproduce human vibration response at the interface between the dummy apparatus and seat cushions. This combination differs from a pure metal spring-mass system of the prior art in the following areas: (1) it utilizes the spring and damping in both the rubber lower torso and the metal mechanical part to reproduce a human vibration response so it is structurally unique; (2) it produces a system response without damper friction problems so as to greatly improve vibration coherence; (3) it produces a body pressure distribution similar to a human on the seat cushions because of its lower torso structural compliance and greatly improves the posture stability during vibration; and (4) the weight of the moving mass can be adjusted to match different percentiles of humans.

Differences between this new vibration dummy apparatus and other mechanical dummies is that (1) it uses a soft human tissue-like lower torso so it matches compliance better than the previous ones; and (2) it utilizes the spring and damping characteristics of the compliant lower torso. The lower torso is integrated with the spring-mass load simulating the top body of human so that the integrated dummy consists of two parts. This unique design greatly improves the accuracy and stability of transmissibility measurement and provides a direct application tool in seat prototype development.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a side schematic view of a vibration dummy apparatus constructed in accordance with the present invention;

FIG. 2 illustrates five graphs of transmissibility vs. frequency for three subjects and the vibration dummy apparatus at a first level of random excitation for comparison purposes;

BEST MODE FOR CARRYING OUT THE INVENTION

Figure 3:
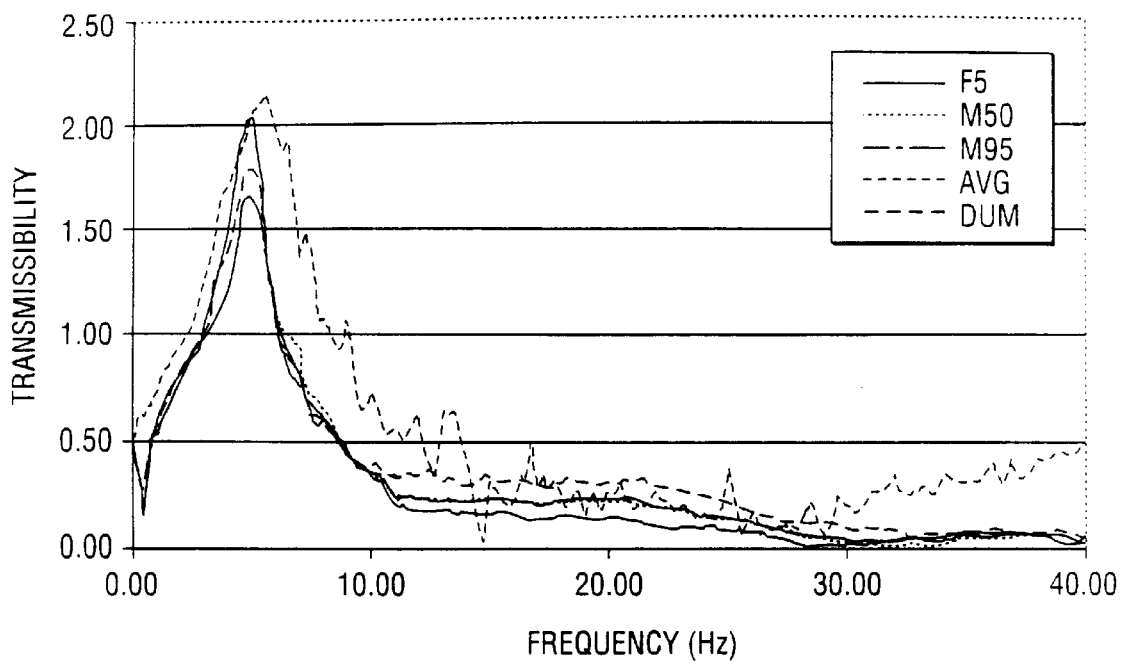
FIG. 3 is similar to FIG. 2 except for a second level of random excitation.

Referring now to FIG. 1, there is illustrated a vibration dummy apparatus constructed in accordance with the present invention, generally indicated at 10. As illustrated in FIG. 1, the vibration dummy apparatus 10 sits on and is supported by a vehicle seat, indicated by phantom lines 12, to accurately simulate human vibration response at an interface between the apparatus 10 and seat cushions 14 and 16 of the vehicle seat 12. In turn, the seat 12 is positioned on a shaker table, indicated by phantom lines 17. The apparatus 10 includes a relatively hard and stiff metal skeletal frame structure, generally indicated at 18, a pelvic girdle 20, a pair of femurs 22 (only one of which is shown), and a pair of ball-and-socket joints 24 (only one of which is shown) for connecting their respective femurs 22 to the pelvic girdle 20. The pelvic girdle 20 and femurs 22 are substantially geometrically accurate and includes a pair of coxae 25 (only one shown). (The pelvic girdle 20 and the femurs 22 of FIG. 1 are not illustrated as being geometrically accurate. However, in the above-noted co-pending applications, which are hereby incorporated by reference, the pelvic girdle 20 and the femurs 22 are so illustrated). The pair of ball-and-socket joints 24 connect their respective femurs 22 to their respective coxae 25.

An elastomeric plastic 26 is formed over the skeletal frame structure 18. The elastomeric plastic 26 has a substantially anatomically-correct, surface geometry. The elastomeric plastic 26 formed over the pelvic girdle 20 and the pair of femurs 22 has mechanical properties including human-like, soft tissue spring and damping characteristics. The plastic 26 formed over the pelvic girdle 20, and the pair of femurs 22 has an effective stiffness in a range of 6 to 140 kPa. The elastomeric plastic 26 may be a castable urethane elastomer molded over the skeletal frame structure 18.

The castable urethane elastomer is known as "Skinflex III". The plastic 26 is made from Skinflex III components by mixing 300 grams of Skinflex III Part "A" into 600 grams of Skinflex Part "B" and then mixing in approximately 1200 grams of Skinflex III Part "C" which is a plasticizer. These components are available from Chembar, Inc. of Groveport, Ohio.

The apparatus 10 also includes a mass-spring system, generally indicated at 30, fixedly connected to the pelvic girdle 20 for simulating vibration response of an upper section of a human including all parts of a human located above the pelvic girdle 20. The mass-spring system 30 includes a mass weight 32 which is adjustable and is mounted on a post 34 fixedly secured to the pelvic girdle 20. The system 30 also includes a spring 36 having an adjustable spring rate.

Alternatively, the system 30 can be made smaller if additional bones and/or bone assemblies of the skeletal frame structure 18 are provided such as a thoracic cage and lumbar vertebrae as disclosed in the above-noted applications.

Test Setup

One 5th percentile female, one 50th percentile male, one 95th percentile male and the apparatus 10 took part in a test wherein different levels and orientations of vibration were applied to a vehicle seat. All sensors signals generated by B&K accelerator pads 40 on the seat were recorded and stored for reference.

Human/Dummy Validation Test

Figure 4:
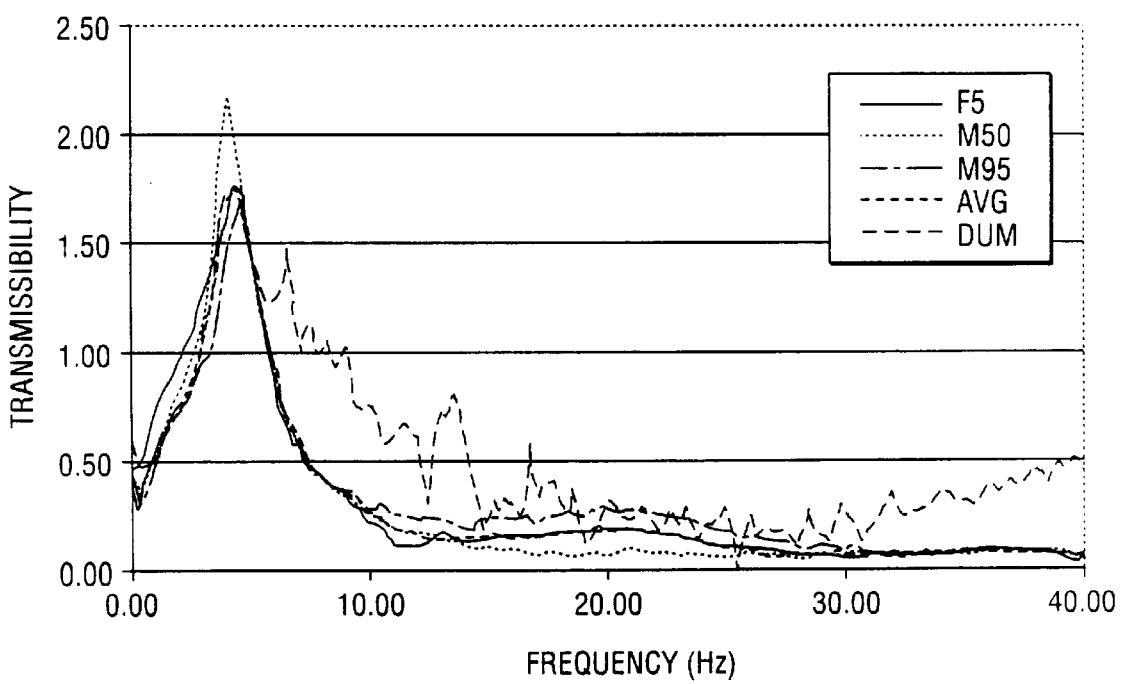
FIG. 4 is similar to FIGS. 2 and 3 except for a third level of random excitation.

The test results from three subjects compared to the dummy apparatus are shown in FIG. 2 through FIG. 4 and their corresponding values are noted in Table 1.

TABLE 1

| SEAT COMPARISON RESULT | | | |
| --- | --- | --- | --- |
| ROAD | 0.04 g | 0.08 g | 0.12 g |
| F5 | 113.6 | 99.63 | 90.82 |
| M50 | 102.3 | 93.61 | 81.11 |
| M95 | 100.3 | 106.0 | 94.6 |
| Avg | 91.9 | 91.0 | 85.6 |
| Dummy | 147.9 | 110.3 | 96.1 |

In the three levels of random signal, it appears that the lowest level shows the largest deviation from dummy to humans. This is most likely due to the rigid motion caused by friction in the mass-spring system 30 when low vibration input was applied. For the other two levels, the results from the dummy match much better with those from the humans. It appears that the dummy matches the 95th percentile male quite well.

In summary, the results measured with the dummy apparatus 10 was compared with those measured with three human subjects in different percentiles and a good match was found in the first transmissibility resonance and overall vibration response.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Vibration dummy apparatus adapted to sit on and be supported by a vehicle seat to accurately simulate human vibration response at an interface between the apparatus and seat cushions of the vehicle seat, the apparatus comprising:

a relatively hard and stiff skeletal frame structure including:

a pelvic girdle; a pair of femurs; and a pair of ball-and-socket joints for connecting their respective femurs to the pelvic girdle;

elastomeric plastic fully formed over the skeletal frame structure so as to fully enclose the pelvic girdle and the ball-and-socket joints, the elastomeric plastic having a substantially anatomically-correct, surface geometry, wherein the elastomeric plastic formed over the pelvic girdle and the pair of femurs has mechanical properties including human-like, soft tissue spring and damping characteristics; and a mass-spring system connected to the pelvic girdle for at least partially simulating vibration response of an upper section of a human.

2. The apparatus as claimed in claim 1 wherein the pelvic girdle and femurs are substantially geometrically correct.

3. The apparatus as claimed in claim 1 wherein the mass-spring system includes a mass weight which is adjustable.

4. The apparatus as claimed in claim 1 wherein the mass-spring system includes a spring having an adjustable spring rate.

5. The apparatus as claimed in claim 1 wherein the pelvic girdle includes a pair of coxae wherein the first pair of ball-and-socket joints connect their respective femurs to their respective coxae.

6. The apparatus as claimed in claim 1 wherein the plastic formed over the pelvic girdle, and the pair of femurs has an effective stiffness in a range of 6 to 140 kPa.

7. The apparatus as claimed in claim 1 wherein the elastomeric plastic is a castable urethane elastomer molded over the skeletal frame structure.

8. The apparatus as claimed in claim 1 wherein the mechanical properties are substantially the same as mechanical properties of bulk muscular tissue in a state of moderate contraction.

* * * * *